(12) United States Patent
Kojima

(10) Patent No.: US 6,447,222 B2
(45) Date of Patent: Sep. 10, 2002

(54) THROWAWAY TIP AND HOLDER FOR HOLDING THE SAME

(75) Inventor: Yoshihide Kojima, Kyoto (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/819,421

(22) Filed: Mar. 27, 2001

(30) Foreign Application Priority Data

Mar. 31, 2000 (JP) ........................................ 2000-099543

(51) Int. Cl.$^7$ ................................................ B23B 51/02
(52) U.S. Cl. ........................ 408/223; 408/230; 408/231; 408/713
(58) Field of Search ................................ 408/223, 224, 408/227, 229, 230, 226, 713, 144, 57, 59, 231, 233

(56) References Cited

U.S. PATENT DOCUMENTS

| 2,360,385 A | * | 10/1944 | Anderson | 408/233 |
|---|---|---|---|---|
| 2,400,856 A | * | 5/1946 | Thompson | 408/233 |
| 5,474,407 A | * | 12/1995 | Rodel et al. | 408/227 |
| 5,599,145 A | * | 2/1997 | Reinauer et al. | 408/233 |
| 5,957,635 A | * | 9/1999 | Nuzzi et al. | 408/231 |
| 6,135,681 A | * | 10/2000 | Nuzzi et al. | 408/227 |

FOREIGN PATENT DOCUMENTS

| JP | 10-029108 | 2/1998 |
|---|---|---|
| JP | 11-188518 | 7/1999 |

* cited by examiner

*Primary Examiner*—Daniel W. Howell
(74) *Attorney, Agent, or Firm*—Hogan & Hartson, LLP

(57) ABSTRACT

A throwaway tip comprises a base which is to be held between a pair of holder pieces of a holder. A cutting edge is provided on a front edge of the base. A pair of holder bearing faces to be respectively brought into abutment against the holder pieces are respectively provided on sides of the base. A rear bearing face to be brought into abutment against a bottom of a pocket of the holder is provided on a rear side of the base. The rear bearing face is substantially orthogonal to the holder bearing faces. Most of a thrust load exerted on the tip during a drilling operation is stably received by the bottom of the pocket.

11 Claims, 4 Drawing Sheets

FIG. 2A
FIG. 2B
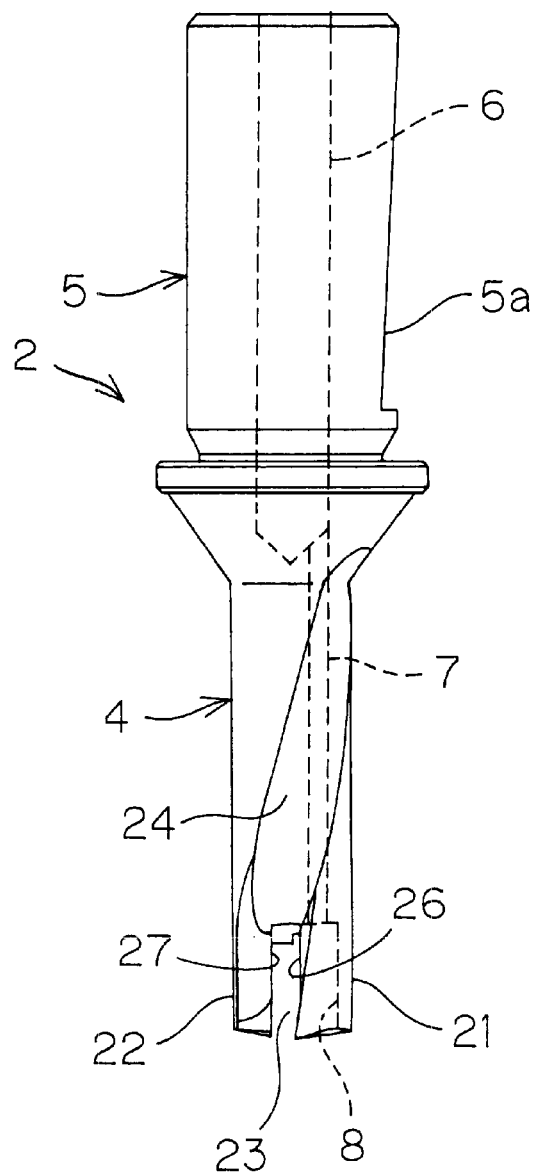
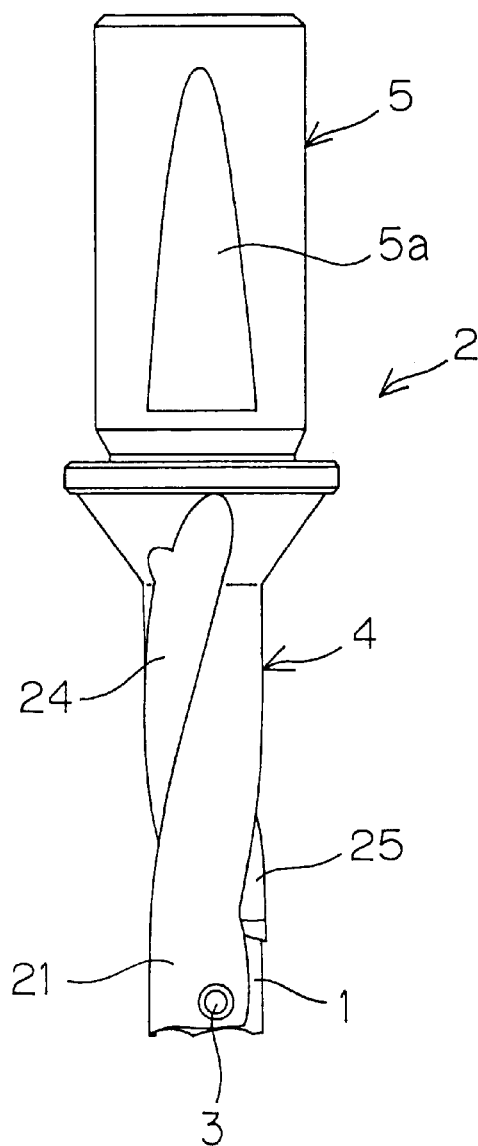

THROWAWAY TIP AND HOLDER FOR HOLDING THE SAME

CROSS REFERENCE TO RELATED APPLICATION

This application claims priority benefits under 35 USC §119 on the basis of Japanese Patent Application No. 2000-99543, the disclosure thereof being incorporated herein by reference.

BACKGROUND OF THE INVENTION

1. Field of the Invention

The present invention relates to a throwaway tip for a drill for drilling, and to a holder for holding the same.

2. Description of Related Arts

Drills for drilling include solid type drills which have a unitary structure, and so-called throwaway-tipped drills which have a throwaway tip having a cutting edge at a front edge thereof and adapted to be attached to a holder by a screw or the like in a removable and replaceable manner.

The throwaway-tipped drills include double tip type drills for drilling a hole of a relatively great diameter (see, for example, Japanese Unexamined Patent Publication No. 10-29108 (1998)), and single tip type drills for drilling a hole of a relatively small diameter (see, for example, Japanese Unexamined Patent Publication No. 11-188518 (1999)).

In the case of the latter single tip type drills, a tip is inserted into a pocket defined between a pair of holder pieces of a holder and held between the pair of holder pieces. The tip is fixed to the holder by inserting a fixing screw into a through-hole of one of the holder pieces and a through-hole of the tip and then screwing a front end portion of the fixing screw into a threaded hole of the other holder piece.

With a recent demand for reduction of a drill diameter, the following problems associated with the diameter reduction are expected to arise.

A force is exerted on the respective holder pieces by the tip to twist the holder pieces in the direction of rotation during a drilling operation. This tends to expand a gap between the pair of holder pieces. Where the holder pieces each have a reduced thickness due to the diameter reduction, the gap between the holder pieces is more easily expanded.

With the reduction of the drill diameter, the diameter of the fixing screw should significantly be reduced. Where the drill has a nominal diameter of 10 mm, for example, the fixing screw needs to have a diameter of about 2.1 to 2.2 mm. This is because, if the fixing screw has a greater diameter, the through-holes of the tip and the holder piece for the insertion of the fixing screw each have a correspondingly greater diameter, thereby reducing the strength of the tip and the holder piece. The reduction in the strength should be prevented.

However, the tip is heavily pressed against the bottom of a drilled hole along the rotation axis during the drilling operation and, therefore, subjected to a strong thrust reaction force. This thrust reaction force is received by the smaller-diameter fixing screw. Hence, there is a possibility that the smaller-diameter fixing screw cannot withstand a shearing stress occurring due to a heavy thrust load. Further, the expansion of the gap between the holder pieces cannot be prevented.

SUMMARY OF THE INVENTION

It is therefore an object of the present invention to provide a throwaway tip which can stably be held even if it is subjected to a resistance during a drilling operation.

In accordance with a preferred embodiment of the present invention to achieve the aforesaid object, there is provided a throwaway tip which is adapted to be received in a pocket of a holder and clamped by a pair of holder pieces defining the pocket therebetween, the throwaway tip comprising: a substantially planar base; a cutting edge provided on a front edge of the base; a pair of holder bearing faces respectively provided on sides of the base to be respectively brought into abutment against the pair of holder pieces; and a rear bearing face provided on a rear side of the base to be received by a bottom of the pocket; wherein the rear bearing face is substantially orthogonal to the holder bearing faces.

In this embodiment, the rear bearing face is substantially orthogonal to the holder bearing faces. Therefore, even if a thrust force is exerted on the tip to press the rear bearing face of the tip against the bottom of the pocket, there is no possibility that the thrust force is converted into a force which forces the pair of holder pieces of the holder away from each other.

Since this embodiment employs such a layout that the rear bearing face of the tip is brought into abutment against the bottom of the pocket, the tip can flexibly be laid out with the rear bearing face thereof being orthogonal to the rotation axis or inclined at a predetermined angle with respect to the rotation axis. In addition, the bearing face is allowed to have a greater area so as to assuredly bear the thrust load. Thus, the tip subjected to the thrust resistance during the drilling operation can be held as stably as possible.

BRIEF DESCRIPTION OF THE DRAWINGS

FIG. 2A is a side view of the holder, and

FIG. 2B is a side view illustrating the holder with the tip attached thereto by a fixing screw as seen from a different aspect;

DETAILED DESCRIPTION OF THE PREFERRED EMBODIMENT

A preferred embodiment of the present invention will hereinafter be described with reference to the attached drawings.

Figure 1A:
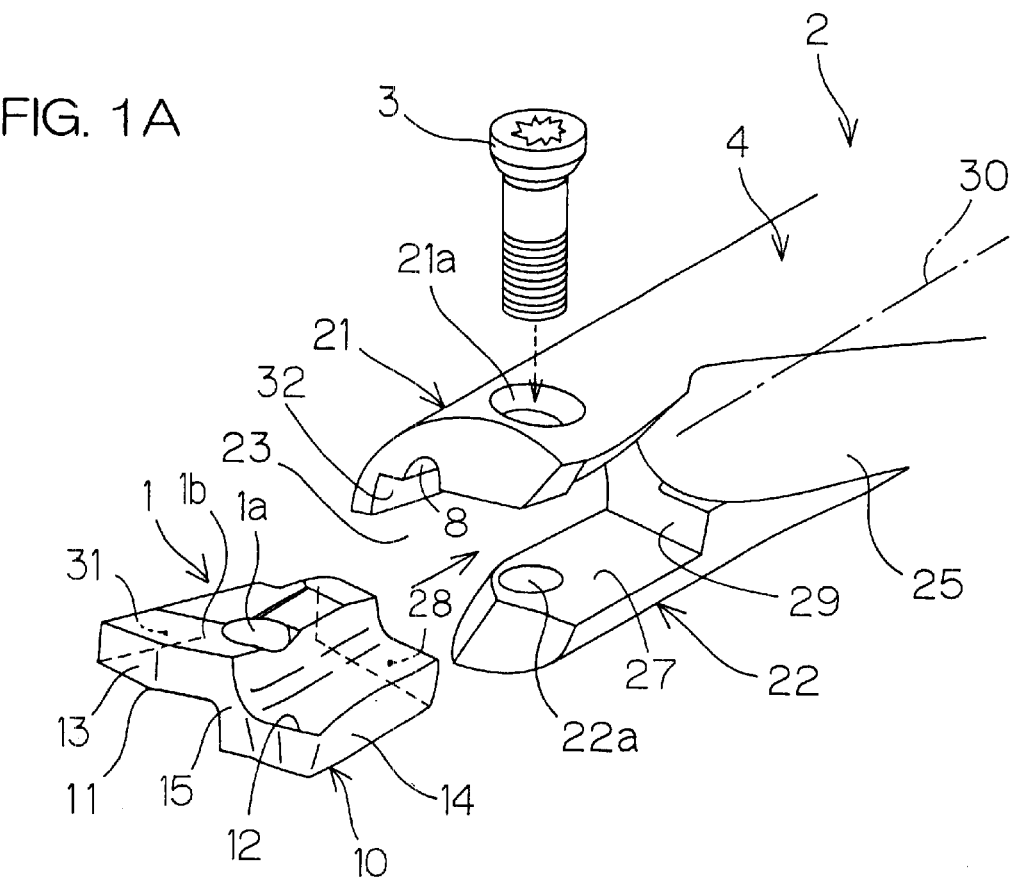
FIGS. 1A and 1B are exploded perspective views illustrating a throwaway tip according to one embodiment of the present invention and a holder for holding the throwaway tip as seen from the front side and the rear side, respectively, of the tip.
Figure 1B:
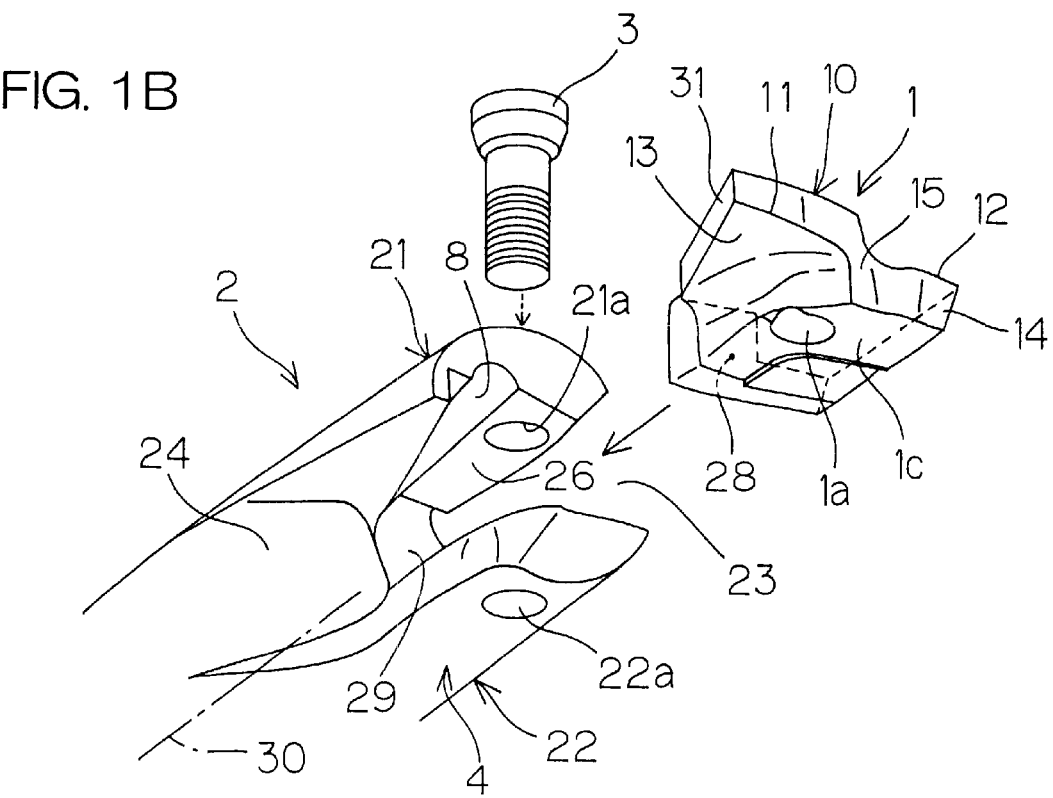

FIGS. 1A and 1B are exploded perspective views illustrating a throwaway tip according to one embodiment of the invention and a holder for holding the throwaway tip. Referring to these figures, the throwaway tip 1 includes a substantially planar base 10. An inner cutting edge 11 for cutting a center area of a hole being drilled and an outer cutting edge 12 for cutting a circumference area of the hole are provided on a front edge of the base 10 with respect to a drilling direction. The base 10 includes a first planar block 13 and a second planar block 14 integrally formed and having the inner cutting edge 11 and the outer cutting edge 12, respectively.

The first block 13 and the second block 14 are offset from each other in an in-plane direction with an overlap portion 15. The overlap portion 15 has the greatest thickness, and is formed with a through-hole 1a extending therethrough in a widthwise direction. The through-hole 1a receives a fixing screw 3 for fixing the tip 1 to a holder 2.

A first bearing face 1b and a second bearing face 1c of the base 10 serving as the pair of holder bearing faces are respectively provided on two surfaces (outer surfaces of the respective blocks 13, 14) disposed in a back-to-back relation, and the through-hole 1a opens into the first and second bearing faces 1b, 1c. A generally L-shaped rear bearing face 28 is provided on a rear end of the base 10 with respect to the drilling direction for mainly applying a thrust load exerted on the tip 1 (along a rotation axis) to the holder 2 during a drilling operation. A side bearing face 31 is provided on a side of the first block 13 substantially orthogonally to the first bearing face 1b for mainly applying a radial load exerted on the tip 1 to the holder 2.

Referring to FIG. 2A which is a side view of the holder and FIG. 2B which is a side view illustrating the holder with the tip attached thereto by the fixing screw 3 as seen from a different aspect, the holder 2 includes a shaft-like drill body 4 and a shank 5 provided coaxially with each other. A flat face 5a which serves as a detent when the holder 2 is attached to a tool holder (not shown) is provided on a circumferential portion of the shank 5.

Referring to FIGS. 1A, 1B and 2A, a pair of holder pieces 21, 22 for holding the tip 1 therebetween are provided at a front end of the drill body 4, and a pocket 23 for receiving the tip 1 is defined between holding surfaces 26 and 27 of the pair of holder pieces 21 and 22. With the tip 1 inserted in the pocket 23, the fixing screw 3 is inserted into a through-hole 21a of the holder piece 21 and the through-hole 1a of the tip 1 and then screwed into a threaded hole 22a formed in the holder piece 22, whereby the tip 1 is fixedly held by the holder 2.

Figure 3:
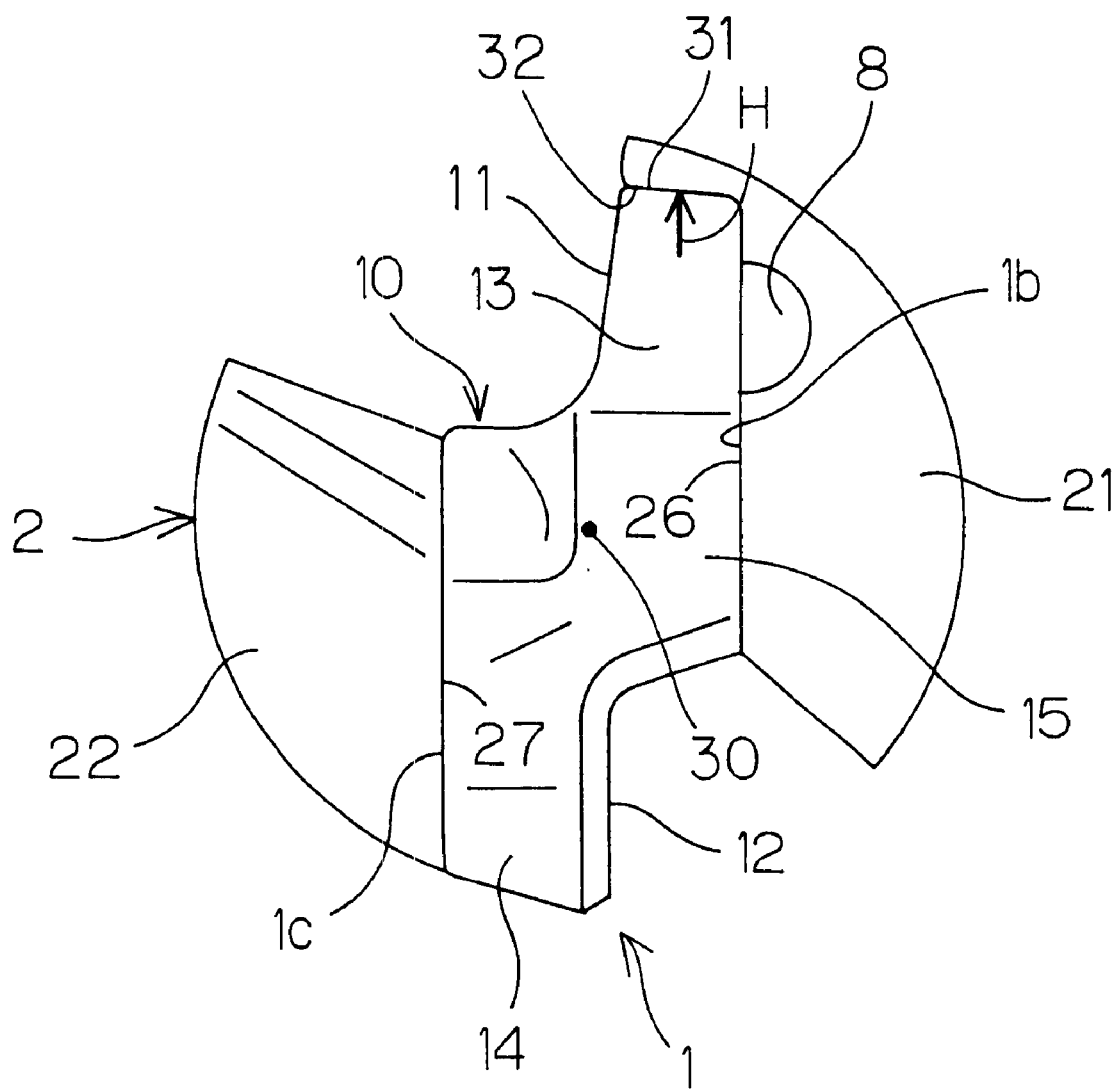
FIG. 3 is a plan view illustrating a distal end of the holder with the tip attached thereto.

Referring to FIGS. 1A, 1B and 3, one of the holder pieces 21 corresponds to the first block 13 having the inner cutting edge 11, and the holding surface 26 thereof is brought into abutment against the first bearing face 1b of the first block 13 which serves as the holder bearing face. The other holder piece 22 corresponds to the second block 14 having the outer cutting edge 12, and the holding surface 27 thereof is brought into abutment against the second bearing face 1c of the second block 14 which serves as the holder bearing face.

As shown in FIGS. 1A and 1B, a bottom restricting face 29 to be brought into abutment against the rear bearing face 28 of the tip 1 for mainly receiving the thrust load exerted along the rotation axis of the tip 1 is provided on the bottom of the pocket 23. A side restricting face 32 to be brought into abutment against the side bearing face 31 of the tip 1 for mainly receiving the radial load is provided on one side edge of the holder piece 21. Helical flutes 24, 25 for ejecting chips out of the drilled hole during the drilling operation are formed in the circumference of the drill body 4.

As shown in FIG. 2A, a first liquid supply channel 6 of a relatively great diameter for supplying a cooling liquid axially extends from an end of the shank 5 to a proximal end of the drill body 4. A second liquid supply channel 7 extends from the proximal end of the drill body 4 to the bottom of the pocket 23 in communication with the first liquid supply channel 6. Further, a liquid supply groove 8 having a semicircular cross section is formed in the holding surface 26 of the holder piece 21 for the first block 13 as extending from a proximal end to a front end of the holder piece 21 in communication with the second liquid supply channel 7. The liquid supply groove 8 is brought into direct contact with the tip 1 to supply the cooling liquid and, therefore, ensures a high cooling effect.

Figure 4:
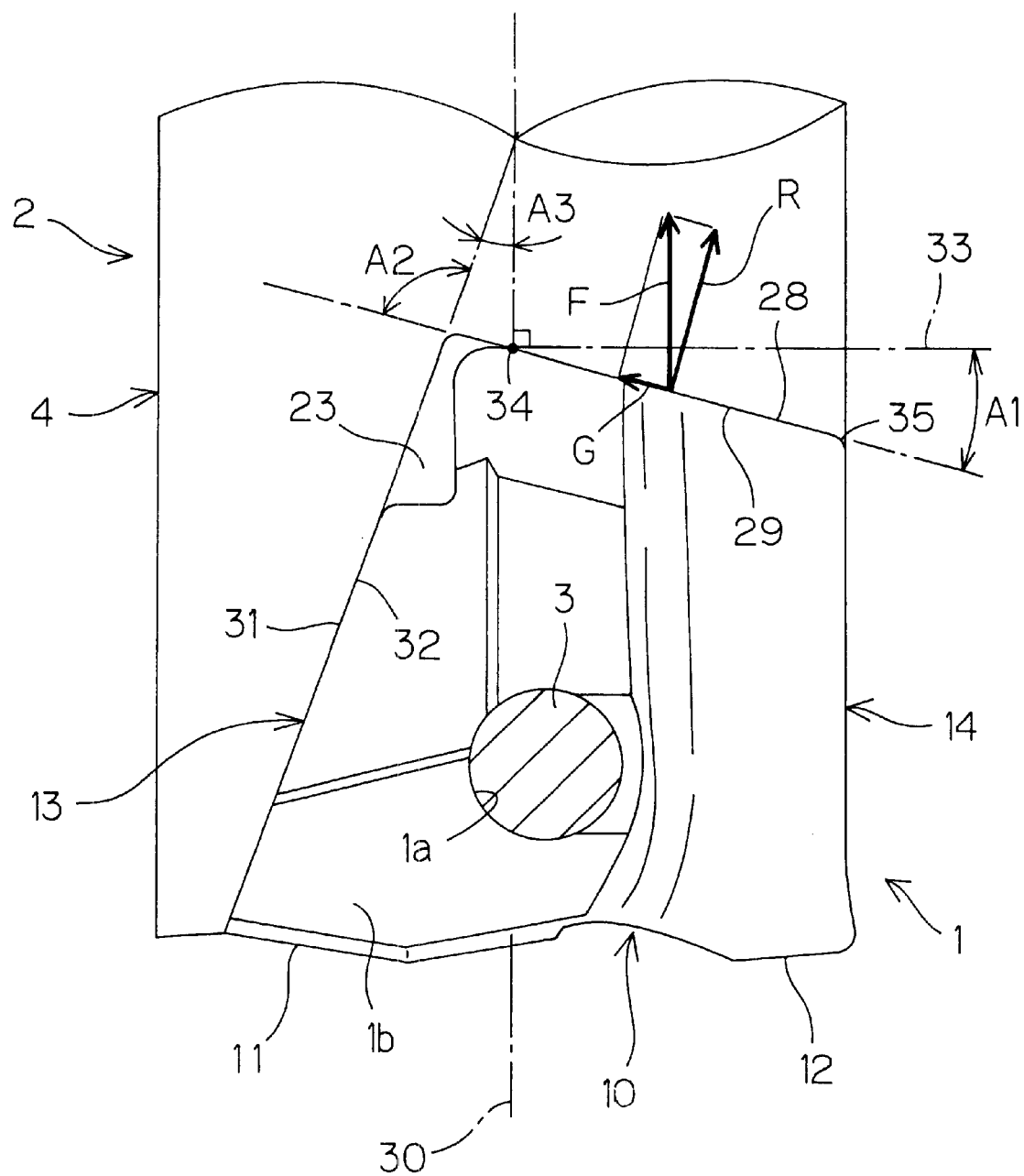
FIG. 4 is a schematic sectional view illustrating how the tip is restricted by the holder.

FIG. 4 is a schematic sectional view illustrating how the tip 1 is restricted in an axial direction and in a radial direction along the holding faces. In FIG. 4, the tip 1 is not shown in section, and the cross section of the drill body 4 of the holder 2 is not hatched.

Referring to FIG. 4, the rear bearing face 28 of the tip 1 and the bottom restricting face 29 of the holder 2 are disposed along a plane 33 orthogonal to the rotation axis 30 or inclined at an angle A1 with respect to the plane 33 orthogonal to the rotation axis 30. The angle A1 should be set smaller than 45 degrees to ensure that most of the thrust load exerted on the tip 1 is received by the bottom restricting face 29. A preferable range of the angle A1 is between 7 degrees and 25 degrees. The angle A1 is, for example, set at 15 degrees.

The rear bearing face 28 is inclined so that a first end portion 34 of the rear bearing face 28 adjacent to the side bearing face 31 is located rearwardly of a second end portion 35 thereof remote from the side bearing face 31 with respect to the drilling direction.

An angle A2 defined between the side bearing face 31 and the rear bearing face 28 of the tip 1 and between the side restricting face 32 and the bottom restricting face 29 of the holder 2 is set at substantially the right angle. A preferable range of the angle A2 is between 80 degrees and 110 degrees. The angle A2 is, for example, set at 95 degrees.

On the other hand, an angle A3 of the side bearing face 31 and the side restricting face 32 with respect to the rotation axis 30 is expressed by $A3=A1+A2-90$, wherein the angles A1 and A2 are defined as described above. Where the angle A1 is 15 degrees and the angle A2 is 95 degrees, for example, the angle A3 is 20 degrees.

The tip 1 is subjected to the thrust load directed parallel to the rotation axis 30 during the drilling operation. Therefore, the thrust load F is applied from the rear bearing face 28 of the tip 1 to the bottom restricting face 29. The thrust load F is resolved into a component force R directed perpendicularly to the bottom restricting face 29 and a component force G which presses the tip 1 toward the side restricting face 32 along the bottom restricting face 29. That is, the bottom restricting face 29 converts a part of the thrust load F into the force which presses the tip 1 against the side restricting face 32.

In this embodiment, the rear bearing face 28 and the side bearing face 31 of the tip 1 are substantially orthogonal to the first bearing face 1b, and the bottom restricting face 29 and the side restricting face 32 of the holder 2 are substantially orthogonal to the holding surfaces 26, 27. Hence, there is no possibility that the thrust load exerted on the tip 1 is converted into a force which forces the pair of holder pieces 21, 22 away from each other.

Particularly, this embodiment employs such a layout that the rear bearing face 28 at the rear end of the tip 1 is brought into abutment against the bottom restricting face 29 at the bottom of the pocket 23, so that the angle A1 can flexibly be set. Therefore, the bearing face is allowed to have a greater area so as to assuredly bear the thrust load. As a result, the tip 1 to be subjected to the thrust resistance due to the drilling operation can stably be held.

Since the tip 1 is restricted in two different directions substantially orthogonal to a holding direction (a direction perpendicular to a paper face of FIG. 4) by the bottom restricting face 29 for the rear bearing face 28 and the side restricting face 32 for the side bearing face 31, the tip 1 can more stably be held.

Further, the side bearing face 31 is provided in the first block 13 having the inner cutting edge 11. This virtually makes it possible to provide the side restricting face 32 on the holder 2 for receiving the side bearing face 31. This is because the outer diameter of the first block 13 is smaller than the outer diameter of the holder 12 which is equivalent to the inner diameter of the hole.

Referring to FIG. 3, a force H exerted on the side restricting face 32 of the holder piece 21 by the tip 1 is directed parallel to the width of the holding surface 26 of the holder piece 21. However, this is not problematic because the holder piece is resistant to the widthwise distortion.

It should be understood that the present invention be not limited to the embodiment described above, but various modifications may be made thereto within the sprit and scope of the present invention.

What is claimed is:

1. A throwaway tip which is adapted to be received in a pocket of a holder and clamped by a pair of holder pieces defining the pocket therebetween, the throwaway tip comprising:
    a base having a first planar block and a second planar block, wherein the first planar block and the second planar block are integrally formed and offset in an in-plane direction;
    an inner cutting edge provided on a front edge of the first planar block;
    an outer cutting edge provided on a front edge of the second planar block;
    a pair of holder bearing faces respectively provided on sides of the base to be respectively brought into abutment against the pair of holder pieces; and
    a rear bearing face provided on a rear side of the base to be received by a bottom of the pocket;
    wherein the rear bearing face is substantially orthogonal to the holder bearing faces.

2. A throwaway tip which is adapted to be received in a pocket of a holder and clamped by a pair of holder pieces defining the pocket therebetween, the throwaway tip comprising:
    a substantially planar base;
    a cutting edge provided on a front edge of the base;
    a pair of holder bearing faces respectively provided on sides of the base to be respectively brought into abutment against the pair of holder pieces;
    a rear bearing face provided on a rear side of the base to be received by a bottom of the pocket;
    wherein the rear bearing face is substantially orthogonal to the holder bearing faces; and
    a side bearing face provided on a side of the base in the vicinity of one of the holder bearing face.

3. A throwaway tip as set forth in claim 2, wherein the side bearing face is substantially orthogonal to the one holder bearing face.

4. A throwaway tip as set forth in claim 3, wherein the side bearing face forms an angle of 80 degrees to 110 degrees with respect to the rear bearing face.

5. A throwaway tip as set forth in claim 2, wherein the rear bearing face is inclined with respect to a plane orthogonal to a rotation axis of the tip.

6. A throwaway tip as set forth in claim 5, wherein the rear bearing face includes first and second end portions, the first end portion being located closer to the side bearing face than the second end portion, the first end portion being located rearwardly of the second end portion.

7. A throwaway tip as set forth in claim 5, wherein an angle defined between the rear bearing face and the plane orthogonal to the rotation axis of the tip is smaller than 45 degrees.

8. A throwaway tip as set forth in claim 7, wherein the angle defined between the rear bearing face and the plane orthogonal to the rotation axis of the tip is between 7 degrees and 25 degrees.

9. A throwaway tip as set forth in claim 2,
    wherein the cutting edge includes an inner cutting edge for cutting a center area of a hole being drilled, and an outer cutting edge for cutting a circumference area of the hole,
    wherein the base includes a first block having the inner cutting edge, and a second block having the outer cutting edge,
    wherein the side bearing face is provided on the first block.

10. A holder for holding a throwaway tip which includes a substantially planar base, a cutting edge provided on a front edge of the base, a pair of holder bearing faces respectively provided on sides of the base, and a rear bearing face provided on a rear side of the base, wherein the rear bearing face is substantially orthogonal to the holder bearing faces , the holder comprising:
    a shaft-like body;
    a pair of holder pieces provided at an end of the body for holding the base of the throwaway tip therebetween;
    a bottom restricting face provided on a bottom of the pocket;
    wherein the bottom restricting face is brought into abutment against the rear bearing face of the throwaway tip for receiving a load exerted parallel to a rotation axis of the throwaway tip; and
    a side restricting face provided on one of the holder pieces orthogonally to a holding surface of the one holder piece and the bottom restricting face,
    wherein the side restricting face is brought into abutment against a side bearing face of the throwaway tip for receiving a radial load exerted along the holding face.

11. A holder as set forth in claim 10,
    wherein the bottom restricting face includes a surface inclined at an angle of smaller than 45 degrees with respect to a plane orthogonal to a rotation axis of the holder,
    wherein the inclined surface converts a part of the load exerted parallel to the rotation axis by the throwaway tip into a force which presses the throwaway tip to the side restricting face.

* * * * *